US007680944B1

(12) United States Patent
Taghizadeh et al.

(10) Patent No.: US 7,680,944 B1
(45) Date of Patent: Mar. 16, 2010

(54) RAPID TRANSPORT SERVICE IN A NETWORK TO PERIPHERAL DEVICE SERVERS

(75) Inventors: Ehassan Taghizadeh, Minneapolis, MN (US); Grant B. Edwards, Minneapolis, MN (US); Kurt Robideau, Zimmerman, MN (US); Stephen P. Erler, Arden Hills, MA (US)

(73) Assignee: Comtrol Corporation, Maple Grove, MN (US)

( * ) Notice: Subject to any disclaimer, the term of this patent is extended or adjusted under 35 U.S.C. 154(b) by 1398 days.

(21) Appl. No.: 10/788,959

(22) Filed: Feb. 27, 2004

Related U.S. Application Data

(60) Provisional application No. 60/451,106, filed on Feb. 28, 2003.

(51) Int. Cl.
| | |
|---|---|
| G06F 15/16 | (2006.01) |
| G06F 9/44 | (2006.01) |
| G06F 9/46 | (2006.01) |
| G06F 13/28 | (2006.01) |
| G06F 13/12 | (2006.01) |
| G06F 13/38 | (2006.01) |
| H04L 12/28 | (2006.01) |
| H04L 12/56 | (2006.01) |
| G08C 19/00 | (2006.01) |
| G06F 15/167 | (2006.01) |
| G06F 15/173 | (2006.01) |
| G06F 3/00 | (2006.01) |
| G06F 13/00 | (2006.01) |
| G06F 5/00 | (2006.01) |
| H04L 12/50 | (2006.01) |
| H04Q 11/00 | (2006.01) |
| H03M 9/00 | (2006.01) |

(52) U.S. Cl. .............. 709/230; 709/203; 709/227; 709/236; 709/249; 709/250; 719/314; 719/321; 719/327; 719/328; 710/15; 710/53; 710/54; 710/112; 370/412; 370/413; 340/825.62

(58) Field of Classification Search ............. 709/203, 709/216, 223, 224, 227, 230, 236, 249, 250; 719/314, 321, 327, 328; 710/15, 23, 53, 710/54, 71, 112; 370/366, 395.72, 412, 413; 340/825.62; 341/100, 101
See application file for complete search history.

(56) References Cited

U.S. PATENT DOCUMENTS 5,596,725 A * 1/1997 Ferguson et al. .............. 710/54

(Continued)

FOREIGN PATENT DOCUMENTS

| EP | 401803 A2 * 12/1990 |
|---|---|
| WO | WO 9814854 A1 * 4/1998 |

OTHER PUBLICATIONS

Romkey, J. "A Nonstandard for Transmission of IP Datagrams over Serial Lines: SLIP," RFC 1055, Jun. 1988, pp. 1-6.*

(Continued)

*Primary Examiner*—Vivek Srivastava
*Assistant Examiner*—Melvin H Pollack
(74) *Attorney, Agent, or Firm*—Kinney & Lange, P.A.

(57) ABSTRACT

A low latency peripheral device sharing system has a host computer with an operating system, a kernel memory buffer, applications, device specific drivers, and a peripheral server driver. The server driver intercepts function calls invoking the local serial ports, and passes standard serial data from the application to a local area network. A device server on the local area network reads the data using a hybrid read block (semi-blocking read), and writes the data to the FIFO registers of the serial device and the remaining data to a queue for the serial device. Finally, the device server times the serial data and returns an intercharacter interval timer flag to the host computer to terminate a read operation.

19 Claims, 2 Drawing Sheets

U.S. PATENT DOCUMENTS

| | | | |
|---|---|---|---|
| 5,673,396 A * | 9/1997 | Smolansky et al. | 710/307 |
| 5,799,169 A * | 8/1998 | Kalapathy | 703/25 |
| 5,889,948 A * | 3/1999 | Smolansky et al. | 709/213 |
| 6,006,338 A * | 12/1999 | Longsdorf et al. | 713/340 |
| 6,072,781 A * | 6/2000 | Feeney et al. | 370/282 |
| 6,212,165 B1 | 4/2001 | Mann et al. | |
| 6,219,353 B1 * | 4/2001 | Wight et al. | 370/425 |
| 6,259,829 B1 * | 7/2001 | Bleecker et al. | 382/306 |
| 6,343,081 B1 * | 1/2002 | Blanc et al. | 370/411 |
| 6,378,011 B1 * | 4/2002 | Moore et al. | 710/71 |
| 6,408,341 B1 * | 6/2002 | Feeney et al. | 709/250 |
| 6,687,757 B1 * | 2/2004 | Ben-Ze'ev et al. | 709/250 |
| 6,735,174 B1 * | 5/2004 | Hefty et al. | 370/235 |
| 6,839,717 B1 * | 1/2005 | Motoyama et al. | 707/104.1 |
| 6,981,036 B1 * | 12/2005 | Hamada | 709/223 |
| 7,000,037 B2 * | 2/2006 | Rabinovitz et al. | 710/71 |
| 7,010,607 B1 * | 3/2006 | Bunton | 709/228 |
| 7,085,805 B1 * | 8/2006 | Ruberg et al. | 709/203 |
| 7,099,316 B1 * | 8/2006 | Tomich et al. | 370/389 |
| 7,116,679 B1 * | 10/2006 | Ghahremani | 370/463 |
| 7,146,233 B2 * | 12/2006 | Aziz et al. | 700/101 |
| 7,165,109 B2 * | 1/2007 | Chiloyan et al. | 709/227 |
| 7,181,531 B2 * | 2/2007 | Pinkerton et al. | 709/238 |
| 7,181,541 B1 * | 2/2007 | Burton et al. | 709/250 |
| 7,190,477 B2 * | 3/2007 | Ferlitsch | 358/1.15 |
| 7,197,049 B2 * | 3/2007 | Engstrom et al. | 370/469 |
| 7,207,041 B2 * | 4/2007 | Elson et al. | 718/104 |
| 7,213,061 B1 * | 5/2007 | Hite et al | 709/223 |
| 7,246,153 B2 * | 7/2007 | Tsuchitoi | 709/217 |
| 7,275,100 B2 * | 9/2007 | Yamagami | 709/224 |
| 7,284,061 B2 * | 10/2007 | Matsubayashi et al. | 709/229 |
| 7,299,277 B1 * | 11/2007 | Moran et al. | 709/224 |
| 7,379,467 B1 * | 5/2008 | Paul et al. | 370/412 |
| 2002/0091826 A1 * | 7/2002 | Comeau et al. | 709/226 |
| 2002/0154102 A1 * | 10/2002 | Huston | 345/204 |
| 2003/0123389 A1 * | 7/2003 | Russell et al. | 370/230 |
| 2003/0165147 A1 * | 9/2003 | Shimada | 370/412 |

OTHER PUBLICATIONS

Fujisawa, K. "DHCP for IEEE 1394," RFC 2855, Jun. 2000, pp. 1-5.*
Casner, S. and Jacobson, V. "Compressing IP/UDP/RTP Headers for Low-Speed Serial Links," RFC 2508, Feb. 1999, pp. 1-24.*
Simpson, W. "The Point-to-Point Protocol (PPP)," RFC 1661, Jul. 1994, pp. 1-54.*
Schneider, K. and Venters, S. "PPP Serial Data Transport Protocol (SDTP)," RFC 1963, Aug. 1996, pp. 1-20.*
Braden, B. et al. "Recommendations on Queue Management and Congestion Avoidance in the Internet," RFC 2309, Apr. 1998, pp. 1-17.*

* cited by examiner

RAPID TRANSPORT SERVICE IN A NETWORK TO PERIPHERAL DEVICE SERVERS

CROSS-REFERENCE TO RELATED APPLICATION(S)

This application claims benefit of Provisional Application No. 60/451,106 filed Feb. 28, 2003 for "Rapid Transport Service" by E. Taghizadeh, G. B. Edwards, K. Robideau, and S. P. Erler.

BACKGROUND

The present invention relates to data communications between network servers and peripheral device servers on a network. More particularly, the present invention relates to a system for low latency data transmissions over a Local Area Network from a network to a peripheral device server.

Generally, the networking and serial communications industries define the term "latency" as the time required for a packet of information to travel from a source to a destination.

Traditionally, internal PC serial cards enabled connection and integration of a wide variety of peripheral devices that provide Input/Output (I/O) support for applications (such as DNC, material handling, SCADA, and Point-of-Sale applications). However, PC serial cards require that the user locate the computer within close proximity of the connected serial-devices. Alternatively, the user could install expensive long-distance serial cabling to connect the computer to peripherals that were deployed remotely from the PC.

With the general adoption of 10Base-T Ethernet by the mid 1990s, serial-cards began to outgrow these proximity limitations. In the late 1990s, Comtrol Corporation of Minneapolis, Minn. and other serial connectivity companies released the first network-based serial concentrators that offered Ethernet based connections to serial devices. By allowing connections to serial devices over the Ethernet Local Area Networks (LANs), these network serial concentrators or "device servers" gained immediate industry attention. New driver software was developed to enable PC-based application software access to the remotely deployed (Network-attached) communication ports, apparently seamlessly. The device servers allowed integrators and system designers to eliminate serial connections at the individual computers and to provide serial connections over the LAN through a device server positioned at the serial peripheral location, regardless of how far they were from the application server. Since the device servers allowed users to maintain control from remotely located networked computers, integrators and systems designers were able to lower equipment and installation costs while enjoying a new level of design flexibility.

For the vast majority of existing serial port related applications, the transition from individual computers with serial cards connected directly to the device to a remotely located, network attached serial device server offered several advantages. First, serial device location was no longer constrained by distance from the PC hosting the Application software with which the device was working. This was significant due to environmental considerations that may have been acceptable for a serial device but not suitable for a PC. Second, existing Ethernet cabling replaced costly serial cabling. Third, Host Application PCs could be moved or changed with no impact to the serial devices.

For serial devices attached directly to a computer communications port (COM port), latency typically is measured in terms of milliseconds, which means that few (if any) users detect latency induced delays in the performance of the peripheral device attached to the COM port. However, with migration of serial ports onto the network, elements such as network traffic, poorly written COM port redirector software, and network hardware (including hubs and routers) each contributed to varying degrees of delay, which could result in a cumulative delay of up to hundreds of milliseconds.

For most applications, such network-induced transmission delays do not present an overriding concern. However, in markets such as material handling, satellite communications, and real-time device monitoring, a delay of even one hundred milliseconds can create major problems. For example, a company that operates an automated package handling system may connect various serial devices (scanners, scales, sorters) used along its conveyor system to a material control application program running on a PC in the shop supervisor's office. When a package passes the scanner, it reads a label, transmits the data over the network to the application which in turn sends a signal to the sorter which directs the package to the proper destination. A delay in receiving the scanner data or receiving the sorter control directive can result in the package having already passed the sorter before the proper routing directions were received. As you can imagine, such a situation would cause chaos and undermine the reliability of the entire package handling system.

The near real-time transmission requirements for such time-sensitive applications place constraints on system designers to include only the most efficiently designed device server. To meet the stringent requirements of these time sensitive applications, device server manufacturers must take great care to optimize their hardware and driver software for low-latency operation. If designed properly, the combination of low-latency device servers with proper network layout and bandwidth considerations will ensure that the benefits of device server technology can be realized even in the most time-critical installations.

Moreover, even with the optimum combination of hardware elements, network transmission protocols and routers introduce additional transmission delays. Furthermore, various interactions between the operating system of the application server, the serial driver software installed on the server for communicating with the serial device server, and the firmware operating in the serial device server can each contribute to the overall transmission latency, which are difficult to detect and to isolate.

Therefore, it is desirable to provide a serial device server communication capability that reduces transmission latencies between a PC server and a serial device server to a level that approximates the latency of a directly connected serial device.

BRIEF SUMMARY

A host computer (or Application PC) having a server driver and peripheral specific drivers is connected to a network. A device server having an operating system, application software, a memory buffer and ports for one or more serial devices is also connected to the network. An application operating on the Application PC communicates to the remote serial device via the network. The device driver mediates between the application on the host computer to take data from the application bound for the serial device and transmit it to the device server via a network. The device server reads this data from the network and writes the data first to the FIFO registers and then to the associated queue. Data from the serial device is received by the device server and checked for inter-character interval timeouts before being placed into a queue.

The data is read from the queue using a semi-blocking read function and is sent along with flags indicating inter-character timeouts to the host computer via the network.

DETAILED DESCRIPTION

Generally, the International Organization for Standardization developed the OSI reference model to facilitate open interconnection of computer systems. Generally, the OSI model categorizes the various process of a computer system into seven distinct functional layers.

Figure 1:
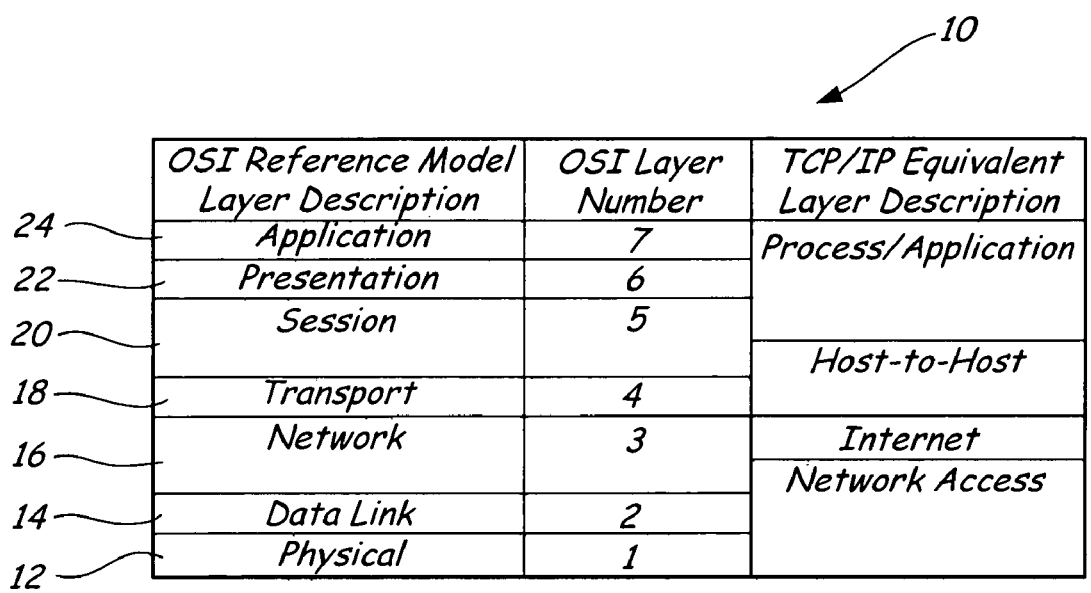
FIG. 1 illustrates the OSI model of the prior art.

FIG. 1 illustrates the seven layer OSI model 10, comprised of the physical layer 12 at the lowest level, the data link layer 14, the network layer 16, the transport layer 18, the session layer 20, and the presentation layer 22, and the application layer 24. From a general perspective, layers 1-3 provide network access, while layers 4-7 involve the logistics of supporting end-to-end communications.

While the OSI model 10 is still applicable to most networking systems, few products are fully OSI compliant. Instead, the basic layer framework is often adapted to new standards, sometimes with substantial changes in the boundaries between the higher layers. As shown the applications and processes tend to spill over from the application layer 24 into the presentation layer 22 and the session layer 20.

When two computers or devices communicate over a Local Area Network (LAN), logically the computers can be thought of as communicating directly between transport layers 18 on each computer. However, in actuality, data is passed from the transport layer 18 to the network layer 16 and to the data link layer 14 and onto the physical layer 12, where the data is transmitted over the LAN. The data is then unpacked at the receiving computer or device in reverse order. Thus, communications flow vertically through the protocol stacks of the OSI model 10, though each layer effectively perceives itself as capable of communicating with its counterpart layer on remote computers.

Generally, TCP/IP or any transport protocol can be considered as occupying the transport layer 18 of the OSI model 10. In operation, an application program, communicating at the application layer 22, passes data to the transport layer 18 where the transport protocol packages the data into segments for transmission over the network. Since the application program can pass large amounts of data, the transport protocol must be capable of breaking down large data blocks into more manageable pieces. Each piece of data is called a segment. Part of the process of segmentation of the data involves the population of TCP header fields.

The network layer 16 generally arranges a logical connection between a source and a destination over the network, including the selection and management of a route for data to flow between the source and destination. Thus, the network layer 16 generally provides services associated with the movement of data, such as addressing, routing, and switching.

Figure 2:
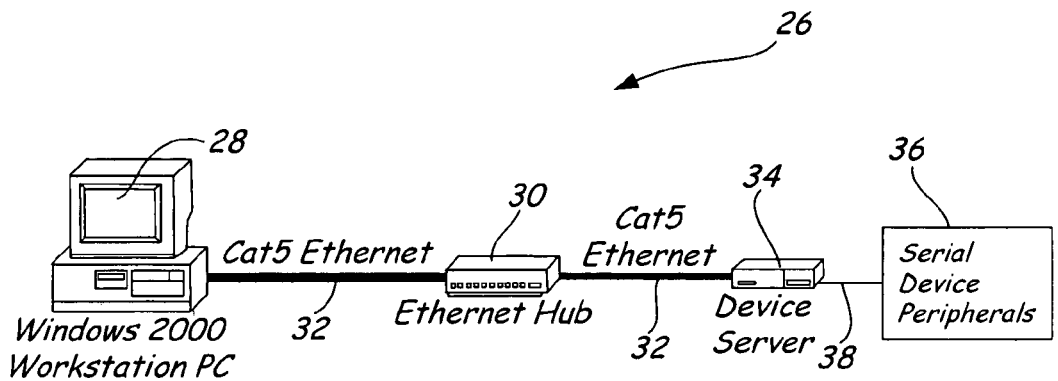
FIG. 2 shows a block diagram of a device server system of the present invention.

FIG. 2 shows a peripheral device server system 26 according to the present invention. The system 26 has a host computer 28 connected to an Ethernet hub 30 via Ethernet cabling 32. The Ethernet hub 30 is in turn connected via Ethernet cabling 32 to the device server 34, to which one or more serial peripheral devices 36 are attached via serial cables 38. Serial peripheral devices 36 may include modems, printers, scanning devices, monitors, and the like. Any device that is ordinarily connected via a serial port connection on a computer can be a serial peripheral device 36. In the present invention, such devices 36 are not connected directly to the host computer 28, but instead are connected directly to the device server 34 as shown.

This arrangement allows the serial devices 36 to be shared by more than one computer over the local area network. Generally, the application program operating on the host computer triggers an event call to the device server 34. The serial data is then transmitted from the host computer 28 over the Ethernet cabling 32 to the hub 30 and on to the device server 34, where the data is directed to a selected serial peripheral device 36.

Figure 3:
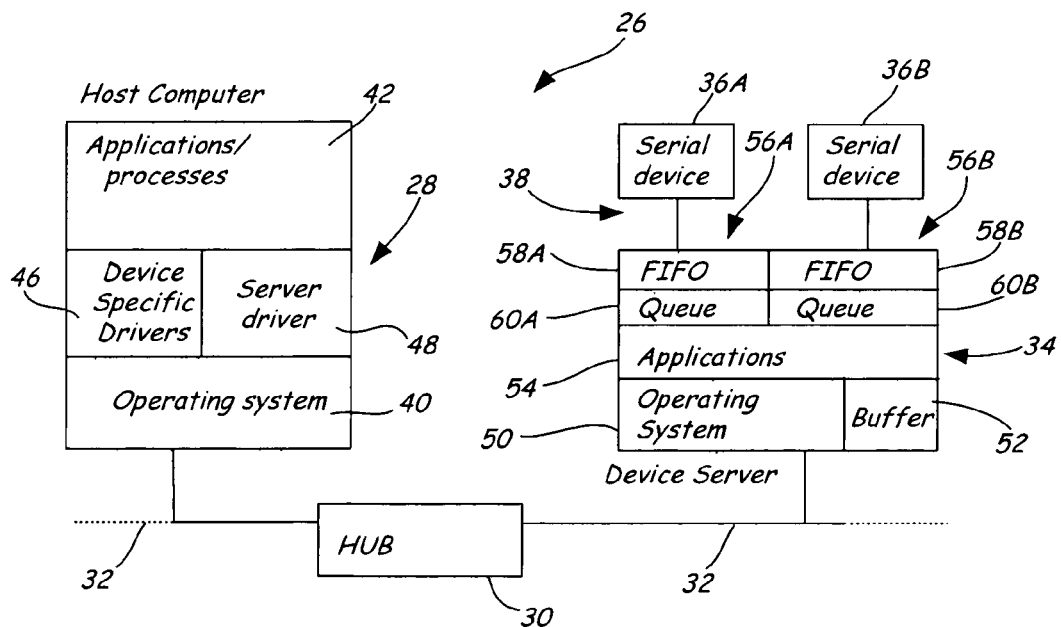
FIG. 3 shows an expanded view of the device server system of the present invention.

As shown in FIG. 3, the system 26 has a host computer 28 connected via Ethernet cabling 32 to hub 30, which is in turn connected to the device server 34 via the Ethernet cabling 32. Finally, the serial devices 36a, 36b are connected to the device server 34 via serial cables 38.

Logically, the host computer 28 has an operating system 40, application/process software 42, device specific serial drivers 46, and a serial server driver 48. It will be understood by a worker skilled in the art that this description is not intended to provide a detailed description of all the elements that make up a computer, but rather to indicate specific elements relating to this invention. Other memory spaces, drivers, ports, and various other elements may also be part of the host computer.

Generally, the application/process software 42 interacts with the device specific serial drivers 46 when the application accesses a serial device 36. Conventionally, such a function call from the application/process software 42 would invoke the serial driver 46 for the specific serial device, and the serial driver 46 would write data in a standard form to a buffer on the serial chip for the specific serial device (which would be directly connected to a communications port on the host computer).

In the preset invention, the application/process software 42 interacts with the server driver 48 when the application accesses serial devices 36 connected to the device server 34. The server driver 48 transfers the data to the device server 34 via the Ethernet cabling 32. The device server 34 the transfers the data to the specific serial device 36.

This transfer process may invoke layers of the OSI model 10 by utilizing, for example, the transport layer 18 to encode and transmit the data through the physical link (i.e. the Ethernet cable 32). Alternatively, the data may be passed directly to the datalink layer 14 for low level encoding and transmission onto the Ethernet cabling 32. In this alternative embodiment, a data link protocol may be used, to directly transmit the data using Ethernet framing and addressing directly to the device server 34, thereby eliminating latency delays introduced by the TCP/IP protocol processing. However, the type of transport protocol used may be chosen by the system designer according to the latency requirements of the system 26.

Once the data is passed to the Ethernet cabling 32, the data is routed via the hub 30 to the device server 34. In one embodiment, the device server 34 has an operating system 50, a buffer 52, applications 54, and a serial chip memory 56a, 56b, including a First input/first output (FIFO) register 58a, 58b and a memory queue 60a, 60b.

In an alternative embodiment, the applications 54 and the operating system 50 can be integrated so that there is no distinction between them. In the embodiment shown, the applications 54 may be stored on the host computer 28 and loaded during startup, or alternatively, the applications 54 may be stored in a memory location (not shown) on the device server 34.

Generally, the data is received by the device server 34, decoded according to the type of transport protocol used to send the data, and the block of data is stored in the buffer 52. The applications 54 then use a semi-blocking read function and a push to FIFO function to improve timing and latency delays between receipt of the data and output of the data to the selected peripheral device 36A,36B.

The data block includes header information specifying the selected peripheral device 36a, and the applications 54 use the header information to direct the data.

Conventionally, blocks of information can be read in one of two ways: blocking or non-blocking. A blocking read does not return until the requested number of data bytes are available. A non-blocking read always returns immediately with however much data is available even if none is available.

Both of these methods cause latency problems. With a blocking read, a long delay may be caused while the call waits for the requested number of bytes to be received. Non-blocking calls must be repeated periodically to check for data availability, and additional latency is introduced by the polling period.

The applications 54 of the present invention eliminate these latency delays by using a "semi-blocking" read which will wait until some non-zero number of data bytes is available and then return all available data up to a specified maximum amount. Thus latency is reduced because the call returns data immediately when it becomes available without waiting for a specified byte count or a polling period.

Data read from the network must then be written to the selected serial device 36A,36B. Each serial device 36A,36B has an associated chip memory 56A,56B, including a FIFO register 58A,58B and a memory queue 60A,60B. The applications 54 determine the selected serial device 36A. If the corresponding queue 60A is empty, the applications 54 write portions of the data block to the FIFO register 58A first, and then any remaining information (once the FIFO register 58A is full) is written to the queue 60A.

Conventionally, data is written directly to the queue and the device server 34 then moves the data from the queue into the FIFO register. This adds a potential queuing delay to the overall latency of the system. In the present invention, by pushing data first to the FIFO register 58A, the system utilizes the available register space and pushes the data to the serial device 36A as fast as possible.

Finally, the Windows operating system has an intercharacter interval timer parameter, which defines when the interval between any two characters exceed a certain preset value. When this occurs a read operation is terminated. When the host Windows computer 28 is directly attached to the serial device, the host computer 28 takes the interval timer measurement directly; however, when the serial devices 36 are attached to the device server 34 on the network, the device server 34 must read the intercharacter timer interval, and take the measurement itself.

Conventionally, such interval timers were ignored by the device server 34. The host computer 28 performed the measurement. In most applications the measurement errors caused by network latencies were not problematic. However, when high data rates and small inter-character timeouts are used, the network latencies cause both interval timeouts to be detected where they should not and valid timeout events to be missed.

Generally, relative to the FIGS. 2 and 3, the server driver 48 on the host computer 28 mediates between the applications 42 and the operating system 40. An application 42 on the host computer 28 makes a series of calls to the server driver 48 in order to perform a read operation with a specified inter-character timeout. The serial driver 48 sends the inter-character timeout setting to the device server 34 via the network.

The device server 34 times the data received from the serial device 36A,36B. When an inter-character interval is detected that exceeds the inter-character timeout setting, a timeout event is sent to the server driver 48 along with the serial data. The serial data and timeout events are sent in a sequence such that the server driver 48 is able to terminate application requested read operations at the correct points in the data stream. This eliminates the errors in inter-character timeout detection that had been introduced by network latency.

Generally, the above specified latency reduction techniques can be applied regardless of the transport protocol used for passing data to the physical layer of the network. Generally, TCP/IP is the most widely used transport protocol. However, TCP/IP introduces latency delays associated with duplicative error checking, which can be eliminated by introducing alternative transfer protocols.

For example, latency delays can be further reduced by implementing proprietary transfer protocols, such as the Rapid Transport Stack (RTS) protocol designed by Comtrol Corporation. The RTS protocol provides for transfer of two types of data: 1) Administrative packets used for identifying devices, for opening asynchronous connections, for downloading software, and for troubleshooting; and 2) Asynchronous packets used to control operation, to transfer data to and from the serial ports, and to report the status of the serial ports.

Generally, asynchronous packets are transferred reliably by the RTS link-layer protocol, in part, because asynchronous packets contain index numbers to insure that missing packets are re-transmitted and that packets are processed in the correct order. By contrast, administrative packets are not indexed, and any loss of administrative packets must be handled at the application level. In actual use, Asynchronous packets form a point-to-point link, while administrative packets may be broadcast.

For both kinds of packets, the RTS protocol depends on the standard Ethernet CRC hardware to detect and discard corrupted packets. The RTS protocol does not include any addressing mechanism of its own. Rather, it utilizes the Ethernet hardware addresses configured by the manufacturer of the Ethernet device. In order to differentiate RTS protocol packets from other network traffic, the RTS protocol uses a unique Ethernet packet type field value. In addition to the Ethernet address, the RTS protocol uses an additional byte in the packet header to distinguish between product families, such as between the VSx000 family and the RPSH/Device-Master family.

Ethernet hardware includes features for generation and verification of a 32-bit CRC to insure packet integrity. This feature is used by the RTS protocol instead of a software checksum. Each asynchronous packet header includes two fields used by the RTS protocol to insure link integrity: the "send index" and the "ack-index." These are both 8-bit fields that are treated as modulo-256 counters that are incremented as packets are transmitted and received.

The send index is the index of the containing packet. The send index is incremented each time a packet is prepared for transmission. For example: the first packet sent has a send index of 0x00, the next one 0x01, then 0x02, 0x03, etc. This field is the count (modulo 256) of the number of indexed packets transmitted (retransmissions are not counted).

The ack index is the index of the packet expected next by the sender of the containing packet. For example, if the last packet correctly received contained a send index of 0x23, the next packet transmitted would contain an ack index of 0x24. This field is the count (modulo 256) of the number of correctly received packets.

Finally, the retransmission of lost packets is accomplished by a simple ack/timeout algorithm. As packets are transmitted, the packets are also stored in a retransmit queue. As packets are received, any packets in the retransmit queue with send indexes less than the received ack index are removed from the retransmit queue. When a packet has been in the retransmit queue for longer than a fixed amount of time, it is retransmitted. Initially this timeout value was 1-2 seconds. In the current implementation, the retransmission timeout is 200 ms. The retransmission will repeat at a fixed interval (same as the retransmission timeout) until an ack causes the packet to be removed or until the connection is shut down from the application level.

When packets are received, the index of the received packet is compared against the expected index value. If the received index is not correct, the packet is discarded. In order to control resource usage, an upper limit is placed on the number of packets in the retransmit queue. When this limit is reached, no additional indexed packets will be transmitted until a received ack index causes one or more packets to be deleted from the retransmit queue. In the current implementation, this limit is set at 8 packets.

In order to reduce overhead in the event of otherwise unidirectional traffic, acks may be delayed so long as the delay does not exceed the retransmit timeout and so long as the number of unacked packets does not exceed the retransmit queue count limit. In the current implementation, an empty non-indexed ack packet is sent if the number of unacked packets exceeds 4 or the age the oldest unacked packet exceeds a fixed limit (originally 0.5-1 seconds, now 100 ms).

In the case of steady bi-directional traffic, no explicit (or "bare") acks are required, since acks are piggybacked on packets that are being used to transfer data and control/status information.

In addition to the reliable transfer of async packets described above, the RTS protocol does provide a way to send "out of band" async packets by allowing non-indexed async packets. Such packets are not held for retransmission and are not acked. Therefore, non-indexed packets are not used for serial port control/data. The main use for non-indexed async packets is to send a "bare" ack that contains no data and will generate no ack of its own.

If the RTS protocol is used instead of TCP/IP, a number of advantages in latency reduction are achieved. First, the IP protocols utilize a media-independent "IP address" for each network node. This has a number of implications: 1) mechanisms or "helper protocols" are required for translating between IP addresses and media-dependent addresses; and 2) mechanisms are required for assigning and configuring IP addresses to specific network nodes. Since the RTS protocol uses only the media-dependent Ethernet address, the RTS protocol eliminates the need for the user to assign IP addresses to nodes and to subsequently configure those devices with the assigned IP addresses. Moreover, the RTS protocol also eliminates the need for "helper protocols" that provide for discovery of and translation between the two address families.

Additionally, by eliminating the additional checksums of TCP/IP over and above packet headers and packet data to detect and discard corrupted packets, the conversion time required is eliminated. The RTS protocol achieves similar error detection/correction functionality by relying on the Ethernet hardware to discard corrupted packets. This eliminates the processing overhead required by the checksums present in the TCP/IP protocols.

Finally, the TCP/IP is a byte-stream service that allows packets to be fragmented or coalesced at any point during transport. By contrast, the RTS protocol is a datagram protocol, which requires that the original packet boundaries be preserved during transport.

Thus, the RTS protocol provides the required data transmission with low overhead because it doesn't require software checksums and doesn't require address lookup and discovery. Additionally, the RTS protocol requires less configuration because Ethernet devices are shipped with preconfigured, universally unique addresses.

However, the RTS protocol embodiment has a limitation that the devices must all be located on a single Ethernet network. The RTS protocol, though offering reduced latency over a LAN, does not function over a Wide Area Network (WAN).

Finally, by changing the packet retransmission timeout to a shorter timeout interval (ie. from 1-2 seconds to 200 ms) retransmission delays were effectively eliminated. This makes recovery of lost packets quicker and smoother than prior implementations.

Thus, the present invention details several techniques for eliminating/reducing latency delays. The semi-blocking read functions for getting data as soon as it is available, the push to FIFO functions for writing data to the FIFO before writing the data to the queue for each serial device and the intercharacter timeout function each serve to reduce latency regardless of the transport protocol. Additional efficiencies may be achieved by eliminating redundant error checking, such as through custom transport protocols. For dedicated LAN environments with extreme sensitivity to latency delays, the custom transport protocol offers the best performance; however, for most applications, TCP is adequate.

While the present invention has been described with respect to a windows PC, workers skilled in the art will recognize that changes may be made in form and detail without departing from the spirit and scope of the invention.

The invention claimed is:

1. A device server system comprising:
    serial devices;
    a device server for connecting the serial devices to a local area network, the device server comprising:
        a FIFO register associated with each serial device, and
        a memory queue associated with each serial device;
    driver software installed on a host computer with an operating system that is connected to a local area network, the driver software for directing serial port data onto the local area network; and
    firmware installed on the device server for facilitating communication between the host computer and a selected one of the serial devices, wherein the firmware directs the serial port data received from the remote computer to the selected one of the serial devices, and wherein the firmware writes portions of the received serial port data to the FIFO register associated with the selected one of the serial devices, if the memory queue associated with the selected one of the serial devices is empty, before writing remaining data of the received serial port data to the memory queue associated with the selected one of the serial devices.

2. The system of claim 1 wherein, when an application on the host computer invokes a function involving a serial device, the driver software transfers data intended for the serial device to a transport protocol of the host computer for transmission to the device server.

3. The system of claim 1 further comprising:
application software installed on the device server for handling device specific flags and timeouts.

4. The system of claim 1 wherein the device server has an operating system and the firmware application functions within the operating system.

5. The system of claim 1 wherein the FIFO registers are located in a serial chip associated with each serial device.

6. The system of claim 1 wherein the driver software utilizes a transport protocol to direct the serial port data onto the local area network.

7. The system of claim 6 wherein the local area network is an Ethernet network and wherein the transport protocol utilizes Ethernet hardware addresses to route the serial data over the local area network.

8. A system for connecting serial devices to a local area network comprising:
a device server in communication with the local area network, the device server comprising:
serial connectors for linking one or more serial devices to the device server;
an operating system; and
applications running on the operating system for coordinating communications between the operating system, the local area network, and the serial device;
a serial driver installed on a host computer and for mediating between host application software and host operating system software installed on the host computer, the host computer being in communication with the local area network, wherein the serial driver transmits serial data from the host application software over the local area network to a selected serial device linked via one of the serial connectors to the device server;
wherein the applications transfer one or more bytes of the serial data from a buffer of the device server to a memory queue associated with the selected serial device when the one or more bytes appears in the buffer without waiting for a specified byte count or a polling period.

9. The system of claim 8 wherein the applications for transferring the serial data transfer serial data as soon as data is available up to a predefined number of bytes.

10. The system of claim 8 wherein the serial driver on the host computer uses a transport protocol for transmitting the serial data over the local area network.

11. The system of claim 10 wherein the transport protocol is TCP.

12. The system of claim 10 wherein the local area network is an Ethernet network and wherein the transport protocol utilizes Ethernet hardware addresses to route the serial data over the local area network.

13. A system for connecting serial devices to a network, the system comprising:
host driver software installed on a host computer connected to the network, wherein the host driver software interfaces with host application software and host operating system software, the host operating system software having a serial port application program interface, wherein the host driver software receives serial port data over the network using the serial port application program interface, the serial port application interface comprising:
an intercharacter interval timer that measures a time interval between the end of a stop signal of one character and the beginning of a start signal of a next character; and
an intercharacter interval setting;
wherein the application program interface terminates a read operation when the time interval measured by the intercharacter interval timer exceeds the intercharacter interval setting
and
a device server connected to the network and in electrical communication with one or more serial devices, the device server comprising:
an intercharacter interval timer that measures a time interval between the end of a stop signal of one character and the beginning of a start signal of a next character: and
an intercharacter interval setting;
wherein the device server receives the serial port data over the network and measures an intercharacter interval corresponding to the intercharacter interval timer setting of the serial port application program interface, and wherein the device server returns a flag to the host computer when the time interval measured by the intercharacter interval timer exceeds the intercharacter interval setting, and wherein the flag signals the host computer that a read operation has terminated.

14. A method for facilitating communication between a host computer and a serial device over a network, the method comprising:
transmitting data in a standard serial port format over a local area network to a selected serial device;
receiving the data at a device server connected to the network, the device server having one or more serial ports connected to one or more serial devices, one of the one or more serial devices being the selected serial device;
storing the received data temporarily in a buffer;
reading the received data from the buffer;
writing the read data to a FIFO register associated with the selected serial device, such that if the FIFO register is empty, the read data is written to the FIFO register until the FIFO register is full and the remaining data is written to a memory queue associated with the selected serial device.

15. The method of claim 14 wherein the step of transmitting comprises:
encoding the data into frames; and
placing the frames onto the local area network.

16. The method of claim 14 wherein the serial devices are connected to the device server via serial cables.

17. The method of claim 14 wherein the step of transmitting comprises:
converting information from an application on the host computer into the data in the standard serial port format using a device specific serial driver;
transferring the data in kernel space on the host computer from a serial port buffer to a transport buffer using a server driver;
encoding the data in the transport buffer; and
transmitting the encoded data onto the local area network.

18. The method of claim 17 wherein the step of receiving comprises:
decoding a received encoded data; and
storing the decoded data in the buffer.

19. A method for eliminating synchronization latencies in a remote device server for facilitating communication between a host computer and a selected serial device, the method comprising:

receiving a read-operation-ending intercharacter interval value corresponding to the selected serial device over a network link from the host computer to the remote device server;

transmitting data in a standard serial port format over a network link from the selected serial device to the remote device server;

receiving the data with the remote device server;

measuring an intercharacter interval of the data with the remote device server by comparing the end of a stop signal of one character and the beginning of a start signal of a next character;

transmitting the data over the network link from the remote device server to the host computer;

transmitting a flag over the network link from the remote device server to the host computer when the intercharacter interval of the data from the selected serial device exceeds the read-operation-ending intercharacter interval value corresponding to the selected serial device;

receiving the flag with the host computer; and terminating a read operation at the host computer.

* * * * *